United States Patent Office 2,711,999
Patented June 28, 1955

2,711,999

VINYL RESIN COMPOSITIONS

John D. Brandner and Robert H. Hunter, Wilmington, Del., assignors to Atlas Powder Company, Wilmington, Del., a corporation of Delaware No Drawing. Application September 18, 1950, Serial No. 185,509

12 Claims. (Cl. 260—31.4)

This invention relates to plasticized compositions of vinyl resins and more particularly to plasticized polyvinyl chloride and copolymers of vinyl chloride with vinyl acetate.

It is an object of the invention to provide novel plasticized vinyl resin compositions.

Another object is to provide vinyl resin compositions plasticized with plasticizers which contribute markedly to the thermal stability of the composition.

A further object is to provide plasticized vinyl resin compositions of superior low temperature flexibility, of low volatility and of high resistance to leaching by water.

The above and other objects will become apparent in the course of the following description and the appended claims.

The compositions of the present invention contain a vinyl resin, a primary plasticizer and a secondary plasticizer. The vinyl resin is selected from the group consisting of vinyl chloride polymers and copolymers of vinyl chloride with vinyl acetate, said copolymers containing not more than about 15% vinyl acetate. Such resins are well known in commerce, and need no further characterization.

Primary plasticizers for vinyl resins, and employed in the compositions of the present invention, are likewise well known in the resin and plastics art. By a primary plasticizer, as distinguished from a secondary plasticizer, is meant one which has high solvency for, and compatibility with, the resin to be plasticized, i. e. with vinyl resins in the present specification. An exemplifying, but not necessarily exhausting list of primary plasticizers for vinyl chloride resins and vinyl chloride-vinyl acetate resins includes the following:

Dioctyl phthalate   Triethylene glycol dioctoate
Dibutyl sebacate    Dioctyl adipate
Trioctyl phosphate  Butyl phthalyl butyl glycolate
Tricresyl phosphate Dibutyl phthalate Secondary plasticizers for vinyl resins unlike primary plasticizers, are not good solvents for the said resins and, by themselves, are incompatible or only slightly compatible with the resins. In admixture with primary plasticizers, however, they become compatible over a wider range of concentration and are frequently incorporated in resin compositions to desirably modify the properties of objects molded, extruded, or otherwise derived therefrom. According to the present invention, vinyl resin compositions are provided which contain as secondary plasticizers compounds not heretofore disclsed for this purpose. By virtue of the presence of these novel secondary plasticizers, resin compositions of markedly increased thermal stability over those of the prior art are provided. The said compositions likewise exhibit superior flexibility at low-temperatures, are very water resistant and exhibit very low volatility. The secondary plasticizers conferring these desirable properties on polyvinyl chloride and polyvinyl chloride-acetate resins where employed in conjunction with known primary plasticizers for such resins are found among the fatty acid esters and tall oil esters of monophenyl ethers of lower glycols. More particularly, they are the esters represented by the generic formula

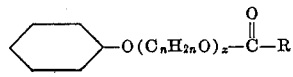

wherein $n$ is a whole number from 2 to 3; the sum of $n+x$ is a whole number from 3 to 4; when $n+x$ is 4,

is the acyl radical of an acid selected from the group consisting of fatty acids containing from 12 to 18 carbon atoms and tall oil; and when $n+x$ is 3,

is the acyl radical of an acid selected from the group consisting of the normally liquid fatty acids containing from 12 to 18 carbon atoms and tall oil. Specific esters conforming to this definition are shown in tabular form below:

| $n$ | $x$ | Acyl Radical of— | Ester |
|---|---|---|---|
| 2 | 1 | Lauric Acid | Phenoxyethyl laurate. |
| 2 | 1 | Oleic Acid | Phenoxyethyl oleate. |
| 2 | 1 | Tall oil | Tall oil ester of phenoxyethanol. |
| 2 | 2 | Lauric Acid | Phenoxy ethoxyethyl laurate. |
| 2 | 2 | Palmitic Acid | Phenoxy ethoxyethyl palmitate. |
| 2 | 2 | Stearic Acid | Phenoxy ethoxyethyl stearate. |
| 2 | 2 | Oleic Acid | Phenoxy ethoxyethyl oleate. |
| 2 | 2 | Myristic Acid | Phenoxyethoxy ethyl myristate. |
| 3 | 1 | Oleic Acid | Phenoxy propyl oleate. |
| 3 | 1 | Lauric Acid | Phenoxy propyl laurate. |
| 3 | 1 | Stearic Acid | Phenoxy propyl stearate. |
| 3 | 1 | Tall oil | Tall oil ester of phenoxy propanol. |

It will be readily appreciated that commercial grades of the above esters containing appreciable quantities of closely related derivatives are equivalent to the named esters and that such mixtures are included when the esters are named. Thus, esters of the mixed acids derived from coconut oil are, for purposes of this invention, the full equivalent of the laurates; cottonseed oil acids or corn oil acids may be substituted for oleic acid, and the like. Similarly the ether alcohol radical of the ester may derive from the mixtures obtained when phenol is caused to react with alkylene oxide in molar proportions to approximate that indicated in the named radical. Thus, reaction products of phenol with from 1 to about 1.4 mols proportions of ethylene or propylene oxide may furnish the phenoxyethyl or phenoxypropyl radical, respectively; and the reaction product of from 1.6 to 2.4 mols of ethylene oxide per mol of phenol may furnish the phenoxyethoxyethyl radical. Methods for the preparation of certain of these esters are disclosed in U. S. 1,943,972, issued January 16, 1934 and for the preparation of others thereof in applications Ser. Nos. 182,122, now Patent Number 2,687,970 and 182,124, both filed August 29, 1950, by the inventors of the present application.

The proportions of the three components of the novel plasticized vinyl resin compositions will vary over a considerable range according to the choice of ingredients and the purpose for which the composition is intended. In general, however, useful compositions are obtained by employing from 5% to 25% secondary plasticizer and from 15% to 67% total plasticizer based on the vinyl resin; the said secondary plasticizer comprising not more than 50% of the total plasticizer.

Compositions coming within the scope of the invention include finished articles molded by extrusion, injection or otherwise, coatings deposited from solutions of the plasticized resins, coatings formed from plastisol and organosol dispersions, sheets and plastic masses obtained by incorporating the resin and plasticizers on hot roll mills, and mechanical mixtures of granular to powdered polyvinyl resins impregnated with the plasticizer. Equally within the scope of the invention are compositions comprising polyvinyl resins plasticized as taught herein and containing also fillers or extenders, pigments, stabilizers and lubricants. The preferred method of preparing the resin-plasticizer compositions is to premix the ingredients in a dough mixer and incorporate them on a 2-roll mill at a temperature of from 270° to 330° F.

Specific examples of compositions illustrating the invention are presented in the following table, the parts of plasticizers being expressed per 100 parts of resin.

| Example No. | Resin | Primary Plasticizer | Secondary Plasticizer |
|---|---|---|---|
| 1 | Polyvinyl chloride | 20 parts Dibutyl phthalate. | 10 parts Phenoxyethyl oleate. |
| 2 | do | 16 parts Dioctyl phthalate. | 6 parts Phenoxyethoxyethyl stearate. |
| 3 | do | 35 parts Tricresyl phosphate. | 20 parts Phenoxypropyl laurate. |
| 4 | Polyvinyl Chloride-Acetate (90/10). | 25 parts Triethylene glycol dioctoate. | 15 parts Phenoxypropyl palmitate. |
| 5 | Polyvinyl chloride-acetate (85/15). | 10 parts Trioctyl phosphate. | 10 parts Phenoxyethoxyethyl laurate. |
| 6 | Polyvinyl chloride | 15 parts Dioctyl adipate. | 10 parts Phenoxyethyl tall oil ester. |
| 7 | do | 40 parts Dioctyl azelate. | 25 parts Phenoxypropyl tall oil ester. |
| 8 | do | 10 parts Dibutyl sebacate. | 6 parts Phenoxyethoxyethyl oleate. |
| 9 | do | 30 parts Butyl phthalyl butyl glycolate. | 20 parts Phenoxypropyl oleate. |

The above examples are of basic compositions which may be modified with pigments, fillers, lubricants and the like to yield compositions suitable for specific applications. By way of illustration, a composition suitable for use in extrusion molding may comprise the following:

Example 10

| | Parts |
|---|---|
| Polyvinyl chloride resin | 100 |
| Dioctyl phthalate | 44 |
| Phenoxyethoxyethyl oleate | 20 |
| Calcium silicate | 2 |
| Calcium carbonate filler | 20 |
| Stearic acid lubricant | 2 |

The thermal stabilizing effect of the secondary plasticizer employed makes it unnecessary for many applications to add any of the conventional heat stabilizers. For severe conditions the composition may be further stabilized by the addition, for example, of 1% basic lead carbonate.

A composition suitable for the injection molding of small parts comprises the following:

Example 11

| | Parts |
|---|---|
| Polyvinyl chloride resin | 100 |
| Dibutyl sebacate | 45 |
| Phenoxyethyl tall oil ester | 15 |
| Calcium silicate | 2 |
| Calcium carbonate filler | 20 |
| Stearic acid lubricant | 1 |

The following composition extruded upon wire forms a very tough, abrasion resistant insulating coating of excellent low temperature flexibility:

Example 12

| | Parts |
|---|---|
| Polyvinyl chloride | 100 |
| Dioctyl phthalate | 15 |
| Phenoxyethyl oleate | 15 |
| Basic lead carbonate | 5 |

A composition suitable for calender coating on cloth or paper is the following:

Example 13

| | Parts |
|---|---|
| Polyvinyl chloride | 100 |
| Dioctyl phthalate | 42 |
| Phenoxyethoxyethyl palmitate | 25 |
| Basic lead carbonate | 5 |
| Whiting and pigment | 25 |

A clear organosol dispersion which may be deposited in a thin film on a fabric base and fused to a clear, adhering, transparent, flexible coating is the following:

Example 14

| | Parts |
|---|---|
| Polyvinyl chloride | 100 |
| Dioctyl phthalate | 30 |
| Phenoxypropyl oleate | 15 |
| Calcium silicate | 3 |
| Xylene | 45 |
| V. M. and P. Naphtha | 45 |

Plasticized compositions containing the novel secondary plasticizers herein disclosed incorporated on a hot roll mill at 270° to 330° F. in the absence of heat stabilizers invariably show less darkening due to thermal degradation. The said secondary plasticizers contribute desirable properties of low temperature flexibility, high resistance to water absorption, and low volatility. By appropriate combination with primary plasticizers the weaknesses of the latter may be overcome without sacrifice of their desirable properties. The comparative data below is illustrative. Sheets were prepared by milling 100 parts of polyvinyl chloride resin with the indicated number of parts of plasticizer in the table, and examined for tensile strength, elongation at rupture, volatility (loss in weight after 24 hours at 100° C.) cold water absorption and cold flex test. The effect of replacing part of the primary plasticizer by the secondary plasticizers of the present invention is shown.

| Sheet No. | 1 | 2 | 3 | 4 | 5 | 6 |
|---|---|---|---|---|---|---|
| Dioctyl Phthalate | 50 | 33 | | | | |
| Phenoxyethyl oleate | | 17 | | | | |
| Dibutyl Sebacate | | | 25 | 12.5 | | |
| Phenoxyethyl Laurate | | | | 12.5 | | |
| Tricresyl Phosphate | | | | | 50 | 37.5 |
| Phenoxyethyl Tall Oil Ester | | | | | | 12.5 |
| Tensile Strength, #/sq. in. | 2,600 | 2,200 | 3,400 | 3,600 | 3,400 | 3,400 |
| Percent Elongation at rupture | 340 | 370 | 240 | 240 | 280 | 290 |
| Shore Durometer Hardness A Scale | 89 | 88 | | | 96 | 94 |
| 24 hour volatility | 2.9 | 1.1 | 10.1 | 7.3 | 0.4 | 0.5 |
| Water absorption | 0.4 | 0.2 | 0.9 | 0.3 | | |
| Brittle Temp., ° F | −40 | −50 | −20 | −20 | +20 | +10 |

It will be observed that by replacing one-third of dioctyl phthalate with phenoxyethyl oleate significant gains in cold flex test and volatility were obtained with no appreciable sacrifice of other desirable properties. Furthermore, by replacing half the dibutyl sebacate of sheet No. 3 with phenoxyethyl laurate (No. 4), there is no impairment of the excellent cold flexibility characteristic of dibutyl sebacate but there are substantial improvements in volatility and water resistance. Replacement of one-fourth of tricresyl phosphate by phenoxyethyl tall oil ester again improved the cold flex temperature without impairing the other properties.

The above disclosure and illustrative examples are sufficient to make clear to those skilled in the art the advantages of the newly disclosed secondary plasticizers and to guide them in the formulation of resin compositions utilizing the advantages. The invention is not limited to the specific formulas shown in the examples nor in any way except as set forth in the appended claims.

What is claimed is:

1. A plasticized vinyl resin composition comprising a resin selected from the group consisting of polyvinyl chloride and copolymers of vinyl chloride and vinyl acetate containing a maximum of 15% vinyl acetate, and from 15% to 67% based on the resin of a plasticizer consisting of a primary plasticizer and a secondary plasticizer selected from the group consisting of phenoxyethyl laurate, phenoxyethyl oleate, phenoxyethyl tall oil ester and esters corresponding to the formula

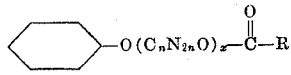

wherein n is a whole number from 2 to 3, $n+x$ is 4, and

is selected from the group consisting of acyl radicals of fatty acids containing from 12 to 18 carbon atoms and the mixed resin and fatty acyl radicals of tall oil acids, the proportion of said secondary plasticizer to said vinyl resin being not less than 5 to 100 and not more than 25 to 100 and said secondary plasticizer being not more than 50% of the total plasticizer.

2. A composition as in claim 1 wherein the vinyl resin is polyvinyl chloride.

3. A composition as in claim 1 wherein the said secondary plasticizer is a phenoxyethyl ester.

4. A composition as in claim 1 wherein the said secondary plasticizer is phenoxyethyl oleate.

5. A plasticized polyvinyl chloride composition consisting essentially of polyvinyl chloride, dioctyl phthalate and phenoxyethyl oleate and containing per 100 parts of resin, from 5 to 25 parts phenoxyethyl oleate, from 15 to 67 parts combined dioctyl phthalate and phenoxyethyl oleate, and no more phenoxyethyl oleate than dioctyl phthalate.

6. A plasticized polyvinyl chloride composition consisting essentially of 100 parts polyvinyl chloride, 15 parts dioctyl phthalate, and 15 parts phenoxyethyl oleate.

7. A composition as in claim 1 wherein the said secondary plasticizer is phenoxyethyl tall oil ester.

8. A plasticized polyvinyl chloride composition consisting essentially of polyvinyl chloride, a primary plasticizer and phenoxyethyl tall oil ester, and containing, per 100 parts of polyvinyl chloride, from 5 to 25 parts of phenoxyethyl tall oil ester, from 15 to 67 parts of combined phenoxyethyl tall oil ester and primary plasticizer and no more phenoxyethyl tall oil ester than primary plasticizer.

9. A composition as in claim 8 wherein the primary plasticizer is dioctyl phthalate.

10. A composition as in claim 1 wherein the said secondary plasticizer is phenoxyethyl laurate.

11. A plasticized polyvinyl chloride composition consisting essentially of polyvinyl chloride, a primary plasticizer and phenoxyethyl laurate, and containing, per 100 parts of polyvinyl chloride, from 5 to 25 parts of phenoxyethyl laurate, from 15 to 67 parts of combined phenoxyethyl laurate ester and primary plasticizer and no more phenoxyethyl laurate than primary plasticizer.

12. A composition as in claim 11 wherein the primary plasticizer is dioctyl phthalate.

References Cited in the file of this patent

UNITED STATES PATENTS 2,098,540    Charch et al. _____ Nov. 9, 1937

OTHER REFERENCES

Page 546, Bennett, Concise Chemical and Technical Dictionary, published 1947, Chemical Publishing Co., Inc., Brooklyn, N. Y.